United States Patent
Oka et al.

(10) Patent No.: US 7,719,619 B2
(45) Date of Patent: May 18, 2010

(54) IMAGE PROCESSING APPARATUS

(75) Inventors: Naoya Oka, Yokohama (JP); Masahiro Nako, Yokohama (JP); Ryo Hasegawa, Yokohama (JP); Rikiya Asaoka, Yokohama (JP); Daisuke Honda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1108 days.

(21) Appl. No.: 11/367,703

(22) Filed: Mar. 6, 2006

(65) Prior Publication Data
US 2006/0256240 A1 Nov. 16, 2006

(30) Foreign Application Priority Data
Apr. 28, 2005 (JP) .............................. 2005-130737

(51) Int. Cl.
*H04N 5/57* (2006.01)
(52) U.S. Cl. ..................................... 348/687
(58) Field of Classification Search ......... 348/671–675, 348/687–689, 678, 691, 379; 382/167–169, 382/284, 254; 358/518, 520
See application file for complete search history.

(56) References Cited

U.S. PATENT DOCUMENTS

| | | | | |
|---|---|---|---|---|
| 3,600,514 A | * | 8/1971 | Poppy .......................... | 348/673 |
| 4,811,101 A | * | 3/1989 | Yagi ............................ | 348/696 |
| 5,255,080 A | * | 10/1993 | Kageyama et al. ........... | 348/675 |
| 5,257,108 A | * | 10/1993 | Muraoka ...................... | 348/674 |
| 5,294,986 A | * | 3/1994 | Tsuji et al. ................... | 348/672 |
| 5,321,513 A | | 6/1994 | Kondo et al. | |
| 5,345,277 A | * | 9/1994 | Blankevoort et al. ........ | 348/679 |
| 5,515,113 A | | 5/1996 | Takeshima | |
| 5,734,362 A | * | 3/1998 | Eglit ............................ | 345/89 |
| 5,808,697 A | * | 9/1998 | Fujimura et al. ............. | 348/672 |
| 6,600,519 B1 | * | 7/2003 | Hwang ........................ | 348/673 |
| 6,952,235 B2 | * | 10/2005 | Park et al. .................... | 348/379 |
| 7,027,098 B2 | * | 4/2006 | Gai et al. ..................... | 348/379 |
| 7,199,840 B2 | * | 4/2007 | Shiota ......................... | 348/678 |
| 2003/0214607 A1 | * | 11/2003 | Kitazawa et al. ............ | 348/678 |

(Continued)

FOREIGN PATENT DOCUMENTS

EP 0 973 128 10/2000

(Continued)

OTHER PUBLICATIONS

Search Report dated Jun. 8, 2006.

(Continued)

*Primary Examiner*—Paulos M Natnael
(74) *Attorney, Agent, or Firm*—McDermott Will & Emery LLP

(57) ABSTRACT

An image processing apparatus is provided that performs more appropriate black stretch processing to display a high quality video. The image processing apparatus includes a luminance characteristics detection unit that analyzes a received video signal to detect a frequency of each of a plurality of luminance areas with a luminance at least equal to or lower than a predetermined luminance, a black stretch processing unit that performs black stretch processing for a luminance signal with a luminance equal to or lower than a predetermined luminance level, and a microcomputer that uses the frequency of each of the plurality of luminance areas, detected by the detection unit, to control the black stretch processing of the black stretch processing unit.

16 Claims, 10 Drawing Sheets

U.S. PATENT DOCUMENTS

2005/0031200 A1 2/2005 Lee et al.

FOREIGN PATENT DOCUMENTS

| EP | 1 359 746 | 11/2003 |
| --- | --- | --- |
| JP | 5-115018 A | 5/1993 |
| JP | 2002-359754 A | 12/2002 |
| JP | 2004-101552 A | 4/2004 |

OTHER PUBLICATIONS

Combined Search and Examination Report issued in corresponding British Application No. GB0624100.4, dated Feb. 22, 2007.

* cited by examiner

IMAGE PROCESSING APPARATUS

INCORPORATION BY REFERENCE

The present application claims priority from Japanese application JP2005-130737 filed on Apr. 28, 2005, the content of which is hereby incorporated by reference into this application.

BACKGROUND OF THE INVENTION

The present invention relates to a video display device such as a TV receiver or a image processing apparatus such as a set-top box including a DVD player or a digital tuner, and more particularly to an image processing apparatus with a configuration in which the luminance distribution of an input video signal is detected for correcting the image quality.

A prior art technology for improving the contrast effect of a video displayed on a display device is disclosed, for example, in JP-A-2002-359754. The disclosed technology detects a luminance histogram from the input video signal and corrects the minimum value of the video signal according to the distribution amount of the minimum interval range in the luminance histogram for adjusting the gray scale near the black.

SUMMARY OF THE INVENTION

The prior art technology described above uses the frequency information only on one luminance area (that is, frequency information only on the minimum luminance area) to correct the gray scale near the black but does not consider the frequency information on other luminance areas with a luminance higher than that of the minimum luminance area. Therefore, according to the technology disclosed in JP-A-2002-359754, if the frequency of the minimum luminance area in the detected luminance histogram is high and if there is no frequency of the luminance area with the next higher luminance, a small amount of gray scale connection is made and, therefore, the black enhancement effect on the low luminance side is decreased. That is, according to the technology disclosed in JP-A-2002-359754, it is difficult to flexibly correct the gray scale.

To perform gray scale correction, especially, to perform black stretch processing (gray scale processing for stretching the black by reducing the luminance level of the video signal with a luminance lower than a predetermined luminance), it is desirable that the frequency information on multiple luminance areas be used for making the detailed analysis of the characteristics of the video in gray scale areas to be corrected. It is also desirable to know the detailed characteristics of the video signal through such an analysis and to perform the processing accordingly.

It is an object of the present invention to provide a image processing apparatus that performs more suitable black stretch processing to display high image-quality video.

An image processing apparatus according to the present invention detects the frequency of each of a plurality of luminance areas with a luminance at least equal to or lower than a predetermined luminance and, based on the frequency of each of the plurality of luminance areas, controls a black stretch range used during black stretch processing. In this case, the black stretch range is a range where the luminance level of the video signal is controlled, for example, lowered (to almost 0). More specifically, the apparatus detects the luminance histogram of the luminance signal in a one-field or one-frame video period. Based on the detected luminance histogram, the apparatus calculates a correction amount for defining the black stretch range according to the frequency of the luminance area on the lowest luminance side and, next, calculates the correction amount according to the frequency of the luminance area with the next higher luminance. The apparatus performs this processing continuously for the luminance areas and, using the sum of the correction amounts calculated for the areas as the correction amount to be actually set, determines the black stretch range based on the sum of the correction amounts. More specifically, the apparatus compares a first frequency detected in a first luminance area having a luminance equal to or lower than a predetermined luminance with a pre-set first threshold to calculate a first black stretch amount, compares a sum of a second frequency, detected in a second luminance area having a luminance higher than that of the first luminance area, and the first frequency with a pre-set second threshold to calculate a second black stretch amount, and sums up the first black stretch amount and the second black stretch amount to calculate the sum of the black stretch amounts. Instead of calculating the sum as described above, it is also possible to compare the frequency of each luminance area with the threshold defined for that luminance area to calculate the first and second black stretch amounts. In this case, if the frequency or the sum of frequencies exceeds the threshold, the first and second black stretch amounts may be set to 0. This gives a black enhancing effect according to the luminance distribution information on the low-luminance side of the input video signal and ensures a best-improved contrast.

An example of the black stretch processing according to the present invention is as follows. That is, the black stretch range, calculated when a first luminance area with a luminance equal to or lower than the predetermined luminance has a first frequency and a second luminance area with a luminance higher than that of the first luminance area has a second frequency, is larger than the black stretch range calculated when the first luminance area has the first frequency and the second luminance area has a third frequency higher than the second frequency. In another example, the black stretch range, calculated when a first luminance area with a luminance equal to or lower than a predetermined luminance has a first frequency lower than a first threshold and a second luminance area with a luminance higher than that of the first luminance area has a second frequency lower than a second threshold, is larger than the black stretch range at the luminance level calculated when the first luminance area has the first frequency and the second luminance area has a third frequency lower than the second threshold and higher than the second frequency.

The present invention makes it possible to perform black stretch processing appropriately and to display a high quality video.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention will be described with reference to the drawings.

First Embodiment

Figure 1:
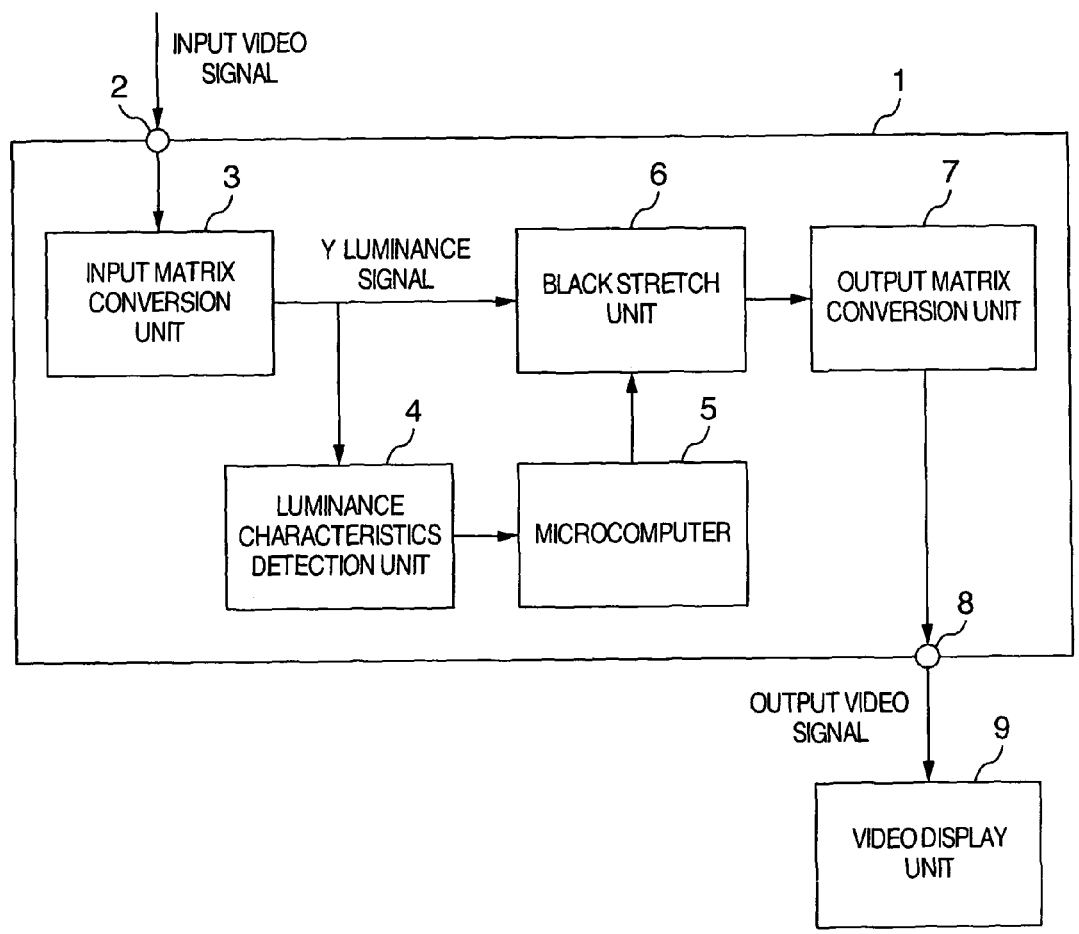
FIG. 1 is a diagram showing the general configuration of a video display device in a first embodiment of the present invention.

FIG. 1 is a block diagram showing a first embodiment of an image processing apparatus of the present invention. In this embodiment, a video display device such as a television receiver that has a video display unit 9, such as a liquid crystal panel or a plasma display panel, is used as an example of the image processing apparatus. The video display device shown in FIG. 1 comprises an image processing apparatus 1 and the video display unit 9 described above. The image processing apparatus 1 comprises an input terminal 2 of the video signal, an input matrix conversion unit 3 that converts the signal format of the RGB signal of a PC (Personal Computer) signal and the video signal (Y, Pb, Pr/Y, Cb, Cr) to the luminance signal Y and the color-difference signal Cb and Cr, a luminance characteristics detection unit 4 that detects a luminance histogram from the luminance signal Y, an operation control unit (hereinafter called microcomputer) 5 that generates various control signals based on the information detected by the luminance characteristics detection unit 4, a black stretch unit 6 that performs the gray-scale correction control for the low luminance according to the frequency distribution of the luminance histogram of the input video signal, an output matrix conversion unit 7 that converts the video signal (Y, Cb, Cr) to the signal format suitable for the panel, and an output terminal 8 of the video signal. The output terminal 8 is connected to the video display unit 9, and the output signal from the output terminal 8 is supplied to the video display unit 9. The following describes the operation of the elements described above in detail.

The television signal or the video signal reproduced by a DVD player is input to the input terminal 2 of the image processing apparatus 1 as an input video signal. The input video signal received by the input terminal 2 is converted by the input matrix conversion unit 3 into the luminance signal Y and the color-difference signal Cb and Cr. The input video signal may have any signal format such as that of the RGB signal, generated as the PC signal, or the video signal (Y, Pb, Pr/Y, Cb, Cr). The luminance characteristics detection unit 4 detects the luminance histogram in a one-field or a one-frame video period from the luminance signal Y. The detected luminance histogram information is input to the microcomputer 5. The microcomputer 5 analyzes the frequency distribution characteristics of the luminance histogram from the received luminance histogram information, forms the luminance control signal based on the frequency distribution that is the analysis result, and outputs the result to the black stretch unit 6. The black stretch unit 6 performs the gray-scale correction control for the low-luminance side of the luminance signal Y based on the luminance control signal formed by the microcomputer 5 and outputs the corrected result to the output matrix conversion unit 7. The output matrix conversion unit 7 receives the luminance signal Y, processed by the black stretch unit 6, and the color-difference signal Cb and Cr, converted by the input matrix conversion unit 3, to generate the RGB three-primary color signal and outputs it to the output terminal 8. At this time, the output matrix conversion unit 7 converts the signal to the three-primary color signal with a signal format approximately matching the screen format (for example, aspect ratio, number of vertical/horizontal pixels) of the video display unit 9. The video display unit 9 uses the output video signal output from the output terminal 8 to display the video. As a result of this processing, a video with a contrast effect better than that of the input video signal is displayed on the video display unit 9. The color-difference signal Cb and Cr, converted by the input matrix conversion unit 3, has its hue and color saturation converted to a desired hue and color saturation by the color correction circuit, not shown, and is supplied to the output matrix conversion unit 7.

With reference to FIGS. 2-7, the following describes the detail of the black stretch control based on the detected luminance histogram. This control is the characteristics of this embodiment. In this embodiment, the luminance characteristics detection unit 4, the microcomputer 5, and the black stretch unit 6 work together to perform the black stretch control.

FIG. 2 is a diagram showing an example of a luminance histogram detection result detected by the luminance characteristics detection unit 4 and an example of the settings used for the black stretch control.

Figure 2A:
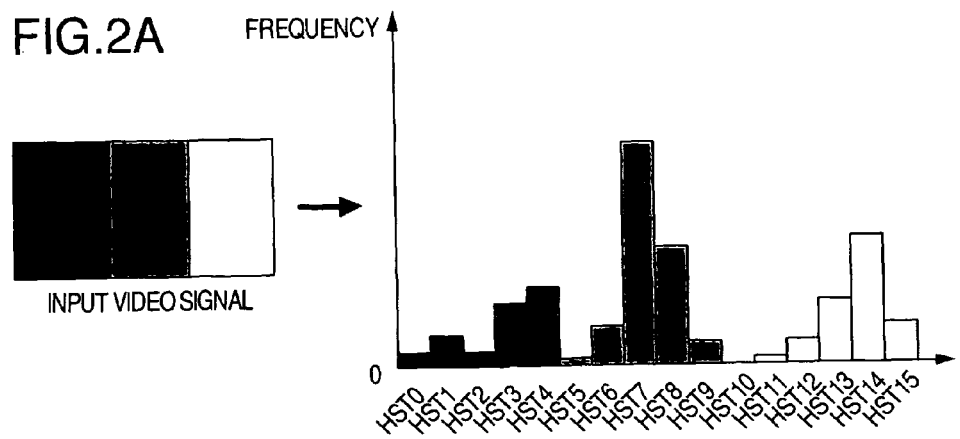
FIGS. 2A-2D are diagrams showing a luminance histogram detection method and various settings of the present invention.
Figure 2B:
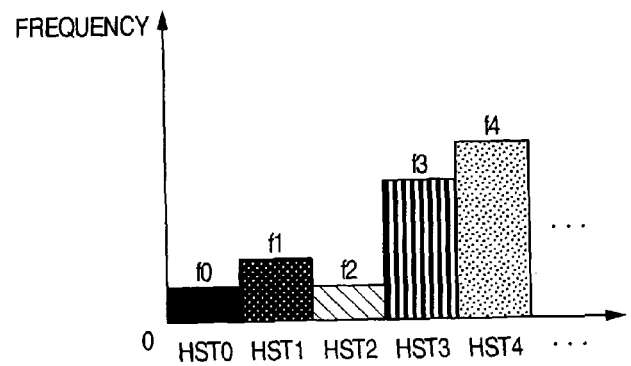

FIG. 2A is a diagram showing the luminance histogram detection result for an input video signal. In this embodiment, the frequency distribution of the detected luminance histogram is analyzed, and the black stretch control is performed according to the frequency. When the input video signal represents a 1024 gray scale image (when the video signal is represented by a 10-bit digital signal), the 1024 gray scales are divided into 16 areas, HST0 to HST15, with 64 gray scales as one luminance area. The luminance histogram is detected by detecting the frequency of each of 16 luminance areas. Although 16 areas are used in FIG. 2A, the number of division areas may also be decreased to 4 or 8 or increased to a number of areas higher than 16. In FIGS. 2A and 2B, the frequency on the vertical axis represents the number of pixels. That is, the bar graphs of the luminance areas shown in FIGS. 2A and 2B represent the number of pixels belonging to the luminance areas.

FIG. 2B is a diagram showing the luminance histogram detection result in the low input-amplitude-level areas in FIG. 2A. In this embodiment, HST0 to HST4 are low-luminance areas having a luminance lower than a predetermined luminance, and the frequencies of the luminance areas are f0 to f4, respectively. The frequencies of HST5 to HST15, not shown in FIG. 2B, are f5 to f15 respectively. That is, the black stretch control is performed in this embodiment using the frequencies of f0 to f15. The following describes the black stretch control when f0 to f4 are used.

Figure 2C:
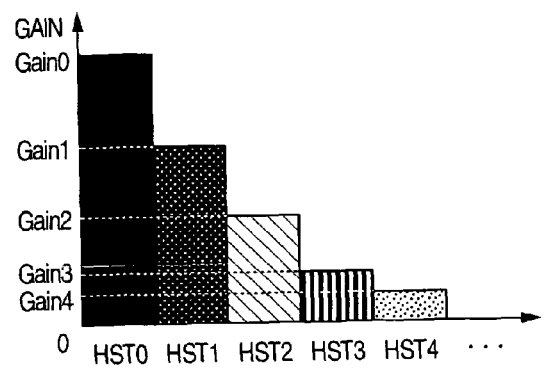

FIG. 2C is a diagram showing the black stretch gain amount (Gain) in the luminance areas. The black stretch gain amount defines a range for filling in black (set to almost 0 in this example). The phrase "filling in black" means here that tone of low luminance area (close to black) signals is decreased and the decreased tone is allocated to the other luminance area signals (high luminance signals). In the description below, this range is called a black stretch range. Therefore, a larger gain amount means a wider black stretch range and a smaller gain amount means a narrower black stretch range. The black stretch range described above may also be referred to as a black stretch amount. In this embodiment, a gain amount is set for each detected black stretch area and the gain amount actually applied is calculated according to the frequency. For example, the gain amounts are set in advance for the luminance areas as follows: Gain0 for area HST0, Gain1 for area HST1, Gain2 for area HST2, Gain3 for area HST3, and Gain4 for area HST4. Although not shown in FIG. 2C, Gain5 to Gain15 can be set for HST5 to HST15. Note that the Gain values shown in FIG. 2C are an example only and any value can be set for the gain amounts.

Figure 2D:
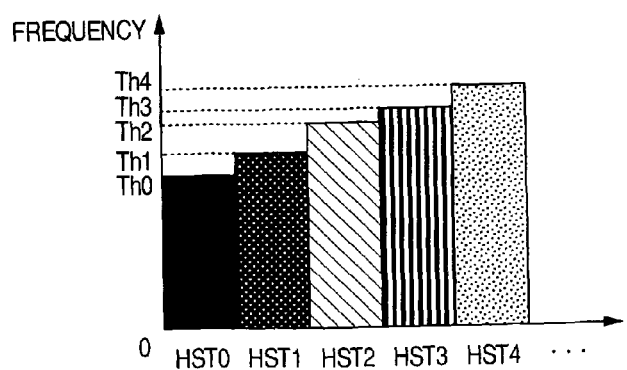

FIG. 2D is a diagram showing a threshold value Th of the frequency in the luminance areas. The threshold value is a limit value of the frequency, used for calculating the gain amount, is defined for the luminance areas. In this embodiment, the gain is not calculated if the frequency of a luminance area exceeds this threshold. The thresholds are set for the luminance areas as follows: Th0 for area HST0, Th1 for area HST1, Th2 for area HST2, Th3 for area HST3, and Th4 for area HST4. Note that the thresholds shown in FIG. 2D are an example only and any value can be set for the thresholds.

Figure 3:
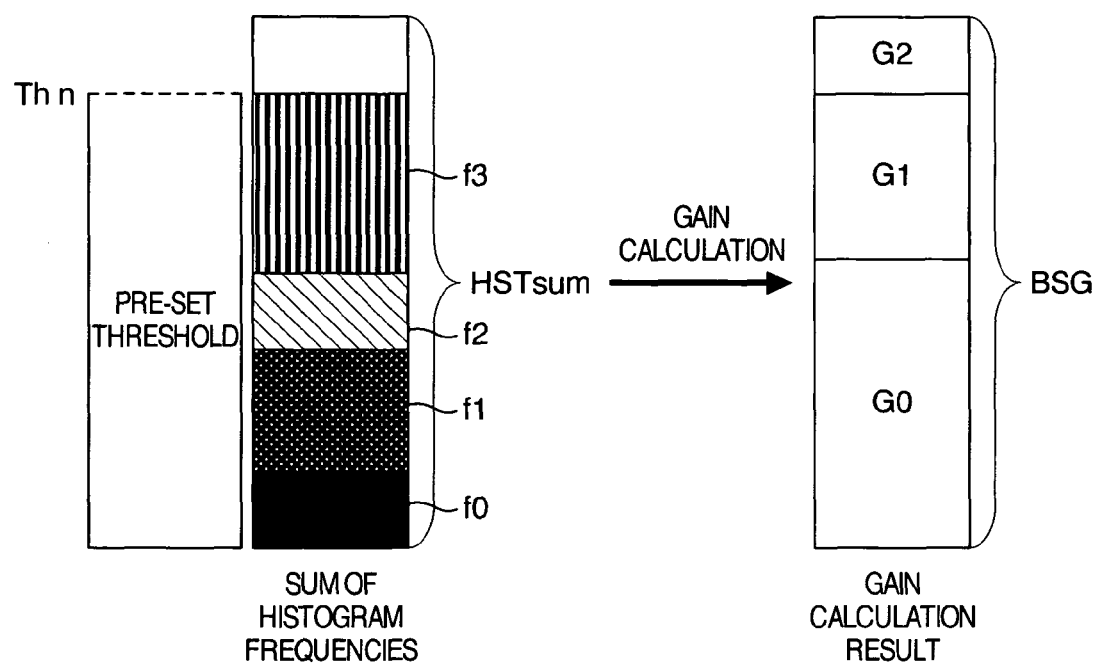
FIG. 3 is a diagram showing a gain amount calculation method used for a black stretch control of the present invention.

FIG. 3 is a diagram showing an example of the method for calculating a gain setting value G. This gain setting value is calculated by the microcomputer 5 using the gain amount in FIG. 2C and the threshold in FIG. 2D based on the frequency distribution of the luminance histogram detected by the luminance characteristics detection unit 4. The black stretch gain setting value is calculated in this embodiment as follows. That is, the microcomputer 5 first references frequency of the lowest luminance area HST0 detected by the luminance characteristics detection unit 4 in the luminance histogram and, after that, references the frequency of higher black stretch areas, HST1, HST2, and so on. First, the microcomputer 5 references f0 that is the frequency of HST0. With the referenced f0 as the histogram frequency sum HSTsum0, the microcomputer 5 compares HSTsum0 with the threshold value Th0 predetermined for HST0. If HSTsum0 does not exceed Th0, the microcomputer 5 calculates the gain setting value G0 according to the rate between HSTsum0 and Th0 using the gain amount Gain0. In this embodiment, the gain setting value G0 is calculated, for example, using expression 1 given below.

$$G0 = \text{Gain0} \cdot \frac{TH0 - HSTsum0(f0)}{TH0} \quad \text{Expression 1}$$

It is apparent from expression 1 given above that G0 gets smaller as HSTsum0 is larger and that G0 gets larger as HSTsum0 is smaller. When HSTsum0 is 0, G0=Gain0.

Next, the microcomputer 5 references the frequency f1 of the luminance area HST1. With sum of the referenced f1 and the previously referenced f0 as HSTsum1, the microcomputer 5 compares HSTsum1 with the threshold value Th1 predetermined for HST1. If HSTsum1 does not exceed Th1, the microcomputer 5 calculates the gain setting value G1 according to the rate between HSTsum1 and Th1 using the gain amount Gain1. In this embodiment, the gain setting value G1 is calculated, for example, using expression 2 given below.

$$G1 = \text{Gain1} \cdot \frac{TH1 - HSTsum1(f0 + f1)}{TH1} \quad \text{Expression 2}$$

It is apparent from expression 2 given above that G1 gets smaller as HSTsum1 is larger and that G1 gets larger as HSTsum1 is smaller. In this case, too, when HSTsum1 is 0, G1=Gain1. Next, the microcomputer 5 references the frequency f2 of the luminance area HST2. With the sum of this referenced f2 and the previously referenced f0 and f1 as HSTsum2, the microcomputer 5 compares HSTsum2 with the threshold value Th2 predetermined for HST2. If HSTsum2 does not exceed Th2, the microcomputer 5 calculates the gain setting value G2 according to the rate between HSTsum2 and Th2 using the gain amount Gain2. In this embodiment, the gain setting value G2 is calculated, for example, using expression 3 given below.

$$G2 = \text{Gain2} \cdot \frac{TH2 - HSTsum2(f0 + f1 + f2)}{TH2} \quad \text{Expression 3}$$

Similarly, G2 gets smaller as HSTsum2 is larger, and G2 gets larger as HSTsum2 is smaller. In this case, too, when HSTsum2 is 0, G2=Gain2. Lastly, the microcomputer 5 references the frequency f3 of the luminance area HST3. Because HSTsum3, which is the sum of the referenced f3 and the previously referenced f0-f2, exceeds Th3, the microcomputer 5 stops the calculation of the gain. As a result, the setting value for defining the black stretch range that is actually applied is BSG calculated as the sum of G0, G1, and G2. Referring to FIG. 3, HSTsum3 exceeds the threshold when f3 is referenced. If the HSTsum3 does not exceed the threshold, the frequency 4 and frequency f5 are added sequentially to HSTsum4 to calculate G4 and G5. In this way, the gain amount Gn in the luminance areas is calculated in this embodiment by the following expression 4.

$$Gn = \text{Gain } n \cdot \frac{THn - \sum_{n=1}^{k} fn}{THn} \quad \text{Expression 4}$$

In the above expression, n is a natural number from 0 to k, and k is a value calculated by subtracting 1 from the number of luminance areas for which the black stretch processing is performed. In this embodiment in which the five luminance areas, HST0 to HST4, are luminance areas for which the black stretch processing is performed, k=4.

On the other hand, in contrast to the above example, if HSTsum0 (=f0) exceeds Th0, the gain setting value is not calculated, G0 is set to 0, and the gain setting value BSG actually applied is also set to 0. Similarly, if HSTsum0 is equal to or smaller than Th0 and HSTsum1 exceeds Th1, only G0 is calculated. As a result, BSG=G0. If HSTsum0 is equal to or smaller than Th0, HSTsum1 is equal to or smaller than Th1, and HSTsum2 exceeds Th2, only G0 and G1 are calculated. As a result, BSG=G0+G1.

That is, the final gain setting value BSG calculated in this embodiment is the sum of the gain setting values G0, G1, G2, ..., Gn calculated for the luminance areas. This means that the expression BSG=G0+G1+G2 ... Gn is satisfied. The calculation of this sum is continued until the accumulated value HSTsumn of the frequencies of the luminance areas exceeds the threshold THn. For example, if the frequency accumulated value HSTsum3 in the luminance area HST3 exceeds the threshold TH3 set up for the luminance area, the gain setting value of the HST3 is not calculated but the calculation of the sum of the gain setting values is stopped at that time. Therefore, the final gain setting value BSG is calculated as BSG=G0+G1+G2.

In this embodiment, the gain is calculated according to the sum (accumulated value) HSTsumn of the frequencies of the luminance areas by referencing the luminance histogram sequentially beginning with the lowest luminance area. Instead of calculating the accumulated value in this way, it is also possible to calculate G0 by referencing only the frequency f0 for HST0, G1 by referencing only the frequency f1 for HST1, and G2 by referencing only the frequency f2 for HST2. That is, it is also possible to individually compare the frequency in each luminance area with the threshold defined for the luminance area to calculate the gain amount of each luminance area.

FIG. 4 is a diagram showing the relation between the BSG calculated as described above and the black stretch processing performed by the black stretch unit 6. That is, the black stretch processing is performed in this embodiment as follows. The black stretch gain amount BSG, calculated by the microcomputer 5 according to the frequency distribution of the luminance histogram detected by the luminance characteristics detection unit 4, is supplied to the black stretch unit 6. The black stretch unit converts the input amplitude level of the luminance signal to the output amplitude level, shown in the figure, according to the gain amount BSG and outputs the converted signal.

Figure 4A:
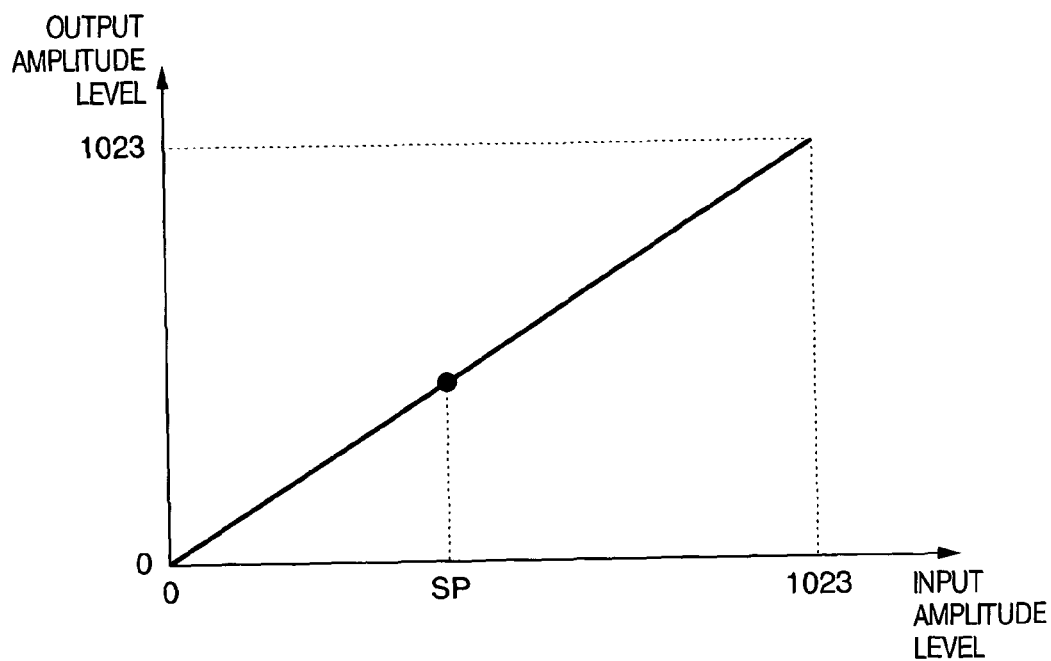
FIGS. 4A-4B are diagrams showing the operation of the black stretch control of the present invention.
Figure 4B:
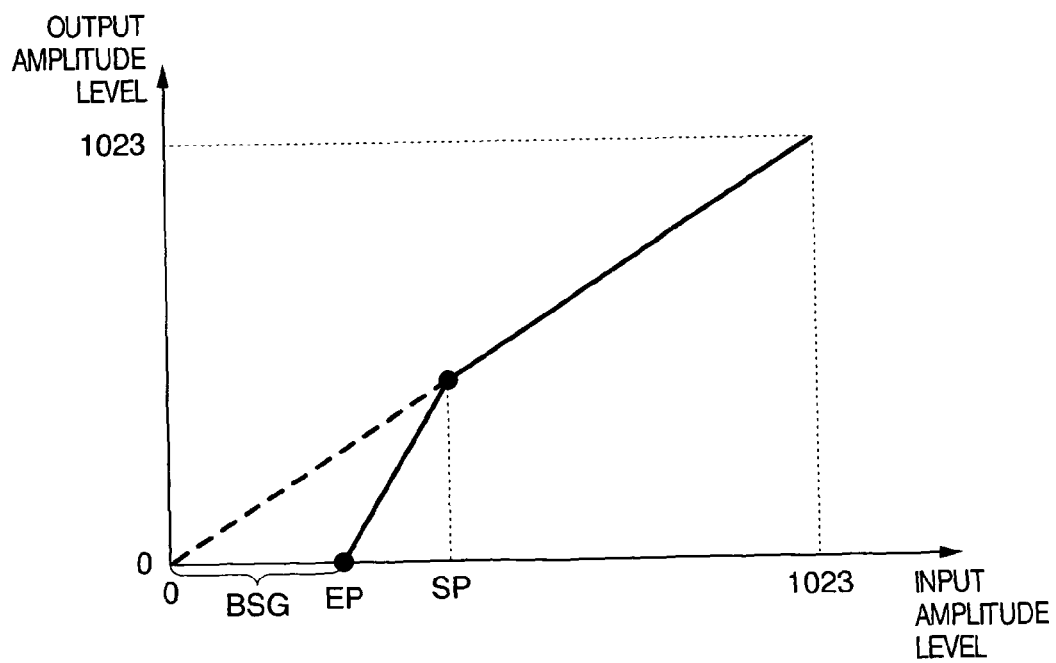

FIG. 4A is an input/output amplitude level characteristics diagram showing the linear characteristics where the input amplitude level is linear to the output amplitude level. For the 10-bit processing, the input amplitude level and the output amplitude level are represented in 1024 gray scales, as shown in FIG. 4A. In this case, the black stretch processing is performed for the input luminance signal equal to or lower than the break point SP, that is, for the input luminance signal with the gray scale equal to or lower than the SP. FIG. 4B is an input/output amplitude characteristics diagram of the black stretch unit 6 when the BSG calculated as described above is applied to the black stretch unit 6. The black stretch unit 6 performs the black stretch control processing for finding the break point EP from the BSG calculated by the microcomputer 5 and joins the SP and the EP with a straight line. This reduces the gray scale near the low input amplitude level equal to or lower than the break point SP and enhances the gray scale near the black level. This increases the visual contrast effect, in particular, the contrast effect in the lower-luminance area. The EP varies with the magnitude of the BSG. That is, the smaller the BSG is, the less powerful the enhancement effect is and, conversely, the larger the BSG is, the more powerful the enhancement effect is. The luminance level in the black stretch range defined by the BSG is lowered to almost 0 as shown in FIG. 4B. Although the black stretch range is treated as the black stretch amount in this embodiment, the slope of the line joining the SP and EP may also be treated as the black stretch amount. In this case, a larger BSG makes the slope steeper and increases the black stretch amount.

Figure 5A:
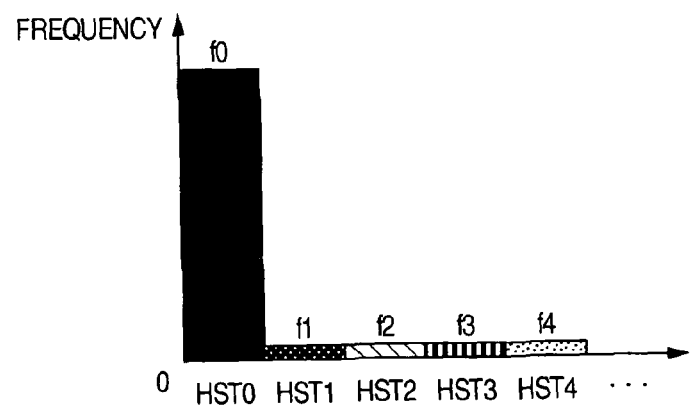
FIGS. 5A-5C are diagrams showing an example of the gain amount calculation method used for the black stretch control in the first embodiment.

FIG. 5 is a diagram showing the calculation result of the black stretch gain amount based on another luminance histogram detection result different from that shown in FIG. 4 and an example of the result generated by applying the calculation result to the black stretch processing. FIG. 5A shows a luminance histogram detection result when the frequency f0 in the luminance area HST0 is very high but the frequencies in other areas are not so high. In this case, the ratio of f0 to the total of the frequencies in the detected luminance histogram becomes very high.

Figure 5B:
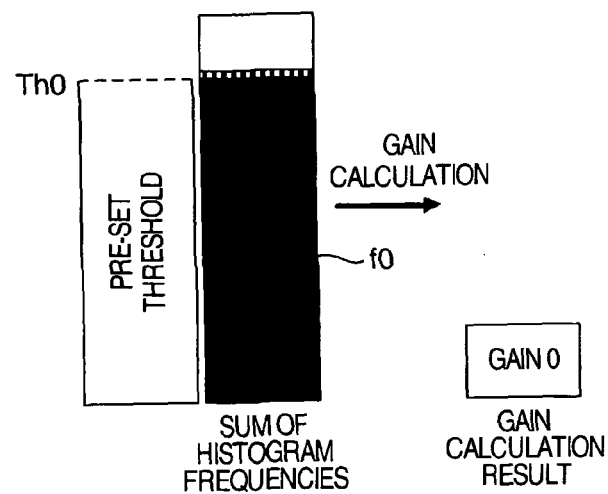

FIG. 5B is a diagram showing the calculation result of the black stretch gain amount calculated based on the frequency distribution shown in FIG. 5A. Because the frequencies other than f0 are very low and f0 is very high, Th0 is exceeded in FIG. 5B. In this case, because the referenced frequency is f0 only, HSTsumn becomes equal to f0. That is, because HSTsumn exceeds Th0 and no gain calculation processing is performed, the BSG becomes 0.

Figure 5C:
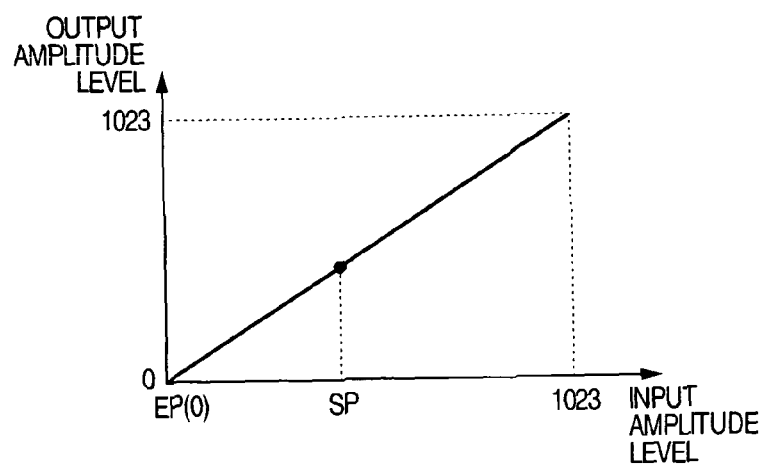

FIG. 5C is a diagram showing the input/output characteristics of the black stretch unit 6 when the BSG (=0) is actually applied to the black stretch unit 6. Because the BSG calculated from FIG. 5B is 0, the EP becomes 0. That is, the line joining the SP and the EP represents the input/output amplitude level characteristics represented by the original linear line. That is, this example shows an example in which the distribution of the low luminance area in the whole screen is large. The black stretch processing, if performed in this case, would cause the so-called under-exposure and reduces the contrast in the low luminance area. The term "under-exposure" means here that tone of low luminance area (close to black) signals is so insufficient that desired contrast of an image can not be obtained in the low luminance area. Thus, when the "under-exposure" is caused, it is difficult to obtain a contrasting image with respect to the low luminance area signals. Therefore, in this embodiment, the black stretch processing is not performed for a video signal with such a luminance histogram to prevent the under-exposure from being generated.

Figure 6A:
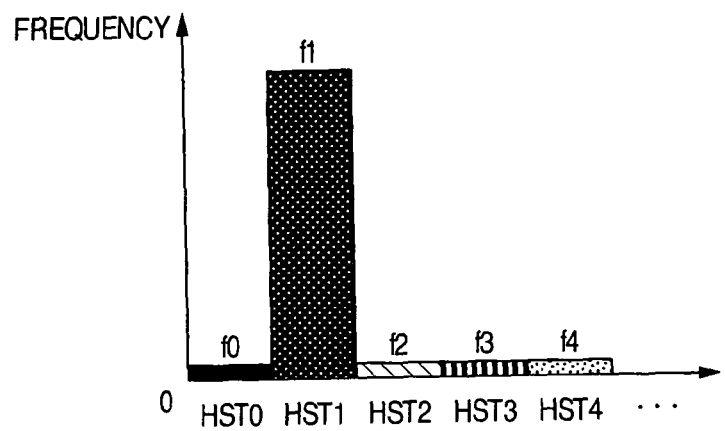
FIGS. 6A-6C are diagrams showing another example of the gain amount calculation method used for the black stretch control in the first embodiment.

FIG. 6 is a diagram showing the calculation result of the black stretch gain amount based on a still another luminance histogram detection result and an example of the result generated by applying the calculation result to the black stretch processing. FIG. 6A shows the luminance histogram detection result when the frequency f1 in the luminance area HST1 is very high but the frequencies in other areas are not so high. In this case, the ratio of f1 to the total of the frequencies in the detected luminance histogram becomes very high.

Figure 6B:
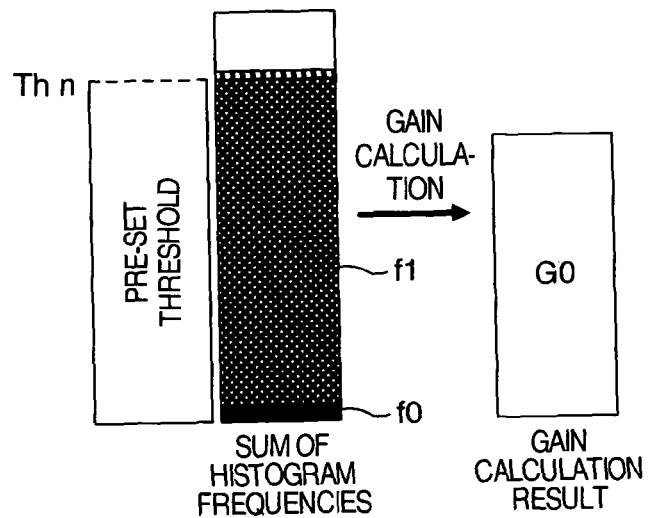

FIG. 6B is a diagram showing the calculation result of the black stretch gain amount calculated based on the frequency distribution shown in FIG. 6A. Because the frequencies other than f1 are very low and f1 is very high, Th1 is exceeded in FIG. 6B. In this case, because the referenced frequencies are f0 and f1, G0 is calculated first as described above with HSTsum0 as f0. Next, HSTsum1 is calculated as the sum of the frequency f0 and the frequency f1. In this case, because HSTsum1 exceeds Th1, the gain calculation processing is stopped and the BSG becomes equal to G0.

Figure 6C:
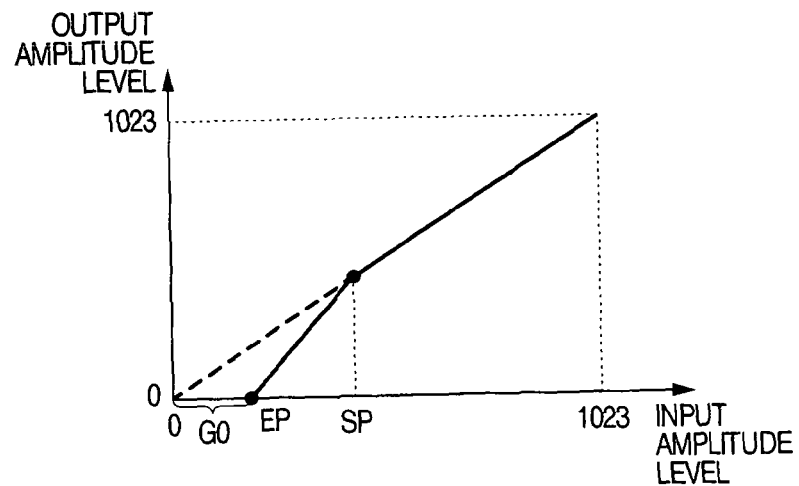

FIG. 6C is a diagram showing the input/output characteristics of the black stretch unit 6 when the BSG (=G0) is actually applied to the black stretch unit 6. The BSG calculated in FIG. 6B sets the EP at the position of G0. That is, joining the SP and the EP with a line represents the input/output amplitude level characteristics shown in FIG. 6C, which enhance the gray scale near the low amplitude level. This increases the visual contrast effect. In this example, the black stretch amount is larger than that of the example shown in FIG. 5 and is smaller than that of the example shown in FIG. 4.

Figure 7A:
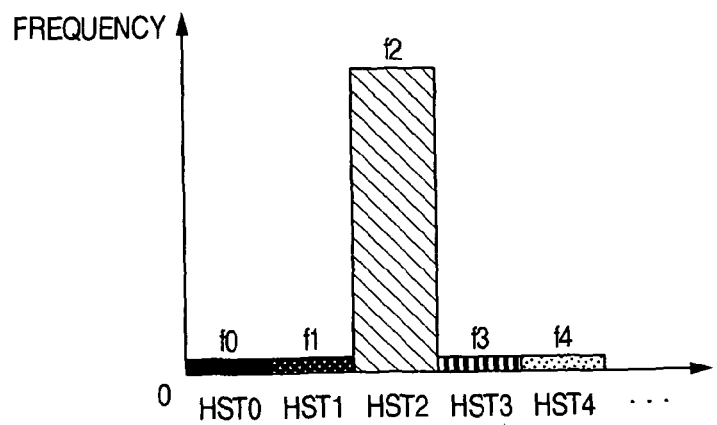
FIGS. 7A-7C are diagrams showing still another example of the gain amount calculation method used for the black stretch control in the first embodiment.

FIG. 7 is a diagram showing the calculation result of the black stretch gain amount based on a still another luminance histogram detection result and an example of the result generated by applying the calculation result to the black stretch processing. FIG. 7A shows the luminance histogram detection result when the frequency f2 in the luminance area HST2 is very high but the frequencies in other areas are not so high. In this case, the ratio of f2 to the total of the frequencies in the detected luminance histogram becomes very high.

Figure 7B:
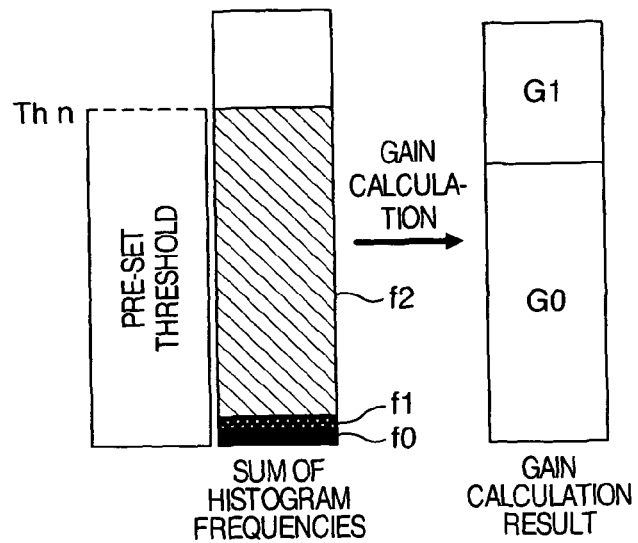

FIG. 7B is a diagram showing the calculation result of the black stretch gain amount calculated based on the frequency distribution shown in FIG. 7A. Because the frequencies other than f2 are very low and f2 is very high, Th2 is exceeded in FIG. 7B. In this case, the referenced frequencies are f0, f1, and f2. Therefore, G0 is calculated first with HSTsum0 as f0 and, after that, G1 is calculated with HSTsum1 as f0+f1. Next, HSTsum2 is calculated as the sum of f0, f1, and f2. In this case, because HSTsum2 exceeds Th2, the gain calculation processing is stopped and the BSG becomes the sum of G0 and G1.

Figure 7C:
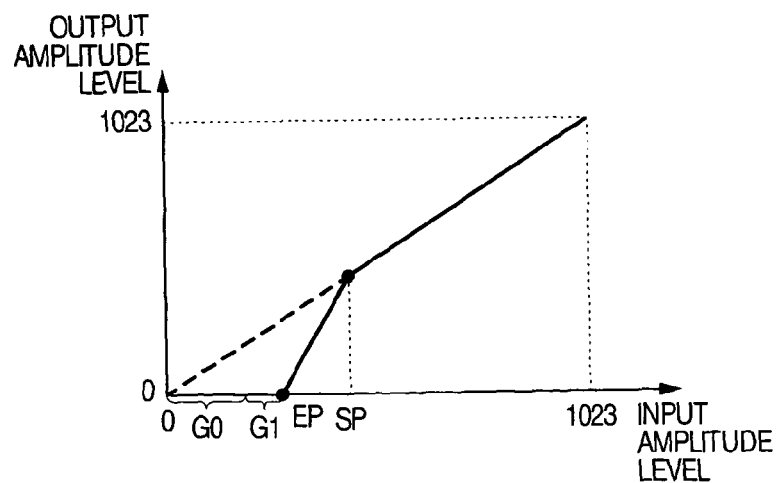

FIG. 7C is a diagram showing the input/output characteristics of the black stretch unit 6 when the BSG (=G0+G1) is actually applied to the black stretch unit 6. The BSG calculated in FIG. 7B sets the EP at the position corresponding to the sum of G0 and G1. That is, joining the SP and the EP with a line represents the input/output amplitude level characteristics shown in FIG. 7C, which further enhance the gray scale near the low amplitude level as compared with those in FIG. 6C. As a result, the visual contrast effect is further increased.

FIG. 4 to FIG. 7 described above indicate that, in multiple luminance areas each with a luminance equal to or lower than a predetermined luminance, the black stretch amount gets larger as the frequency distribution of a high luminance area of those multiple luminance areas is higher and, conversely, the black stretch amount gets smaller as the frequency distribution of a low luminance area of those multiple luminance areas is higher. Therefore, according to this embodiment, the black stretch processing can be performed more suitably while reducing the under-exposure. In addition, the black stretch processing in this embodiment gives the following characteristics. That is, the black stretch range (black stretch amount), calculated when a first luminance area (for example, HST0) with a luminance equal to or lower than a predetermined luminance has a first frequency (f0) and a second luminance area (HST1) with a luminance higher than that of the first luminance area has a second frequency (f1), is larger than the black stretch range calculated when the first luminance area has the first frequency and the second luminance area has a third frequency higher than the second frequency. In addition, the black stretch range (black stretch amount), calculated when a first luminance area (HST0) with a luminance equal to or lower than a predetermined luminance has a first frequency (f0) lower than a first threshold (TH0) and a second luminance area (HST1) with a luminance higher than that of the first luminance area has a second frequency (f2) lower than a second threshold (TH1), is larger than the black stretch range calculated when the first luminance area has the first frequency and the second luminance area has a third frequency lower than the second threshold and higher than the second frequency.

That is, consider a case in which two types of image signal, each with its own histogram pattern, are received. Assume that, the luminance area HST0 of both a first histogram pattern and a second histogram pattern has the same frequency f0 equal to or lower than the threshold TH0. In this case, if the frequency f11 in HST1 of the first histogram pattern is equal to or lower than TH1 and lower than the frequency f12 in HST1 of the second histogram pattern, the difference between f11 and TH1 is larger than the difference between f12 and TH1 and, therefore, the black stretch amount of the first histogram pattern is larger than the black stretch amount of the second histogram pattern. This means that, because the second histogram pattern has a higher distribution of the low luminance area, the black stretch amount is reduced. That is, for a luminance area with a luminance equal to or lower than a predetermined luminance for which the black stretch processing is performed, this embodiment detects the frequency distribution in multiple luminance areas to determine the black stretch amount. Therefore, this embodiment enables more flexible black stretch processing.

As described above, the black stretch control in this embodiment is performed as follows. The microcomputer 5 references the frequencies of the luminance areas in a luminance histogram, detected by the luminance characteristics detection unit 4, sequentially beginning with the lowest luminance side, and calculates the black stretch gain amount for each luminance area. The microcomputer 5 calculates the sum of the black stretch gain amounts of the luminance areas and applies the resulting sum to the black stretch unit 6. This enhances the gray scale of the black on the low luminance side of the video displayed on the video display unit 9 and displays an output video with a better visual contrast effect.

Second Embodiment

Figure 8:
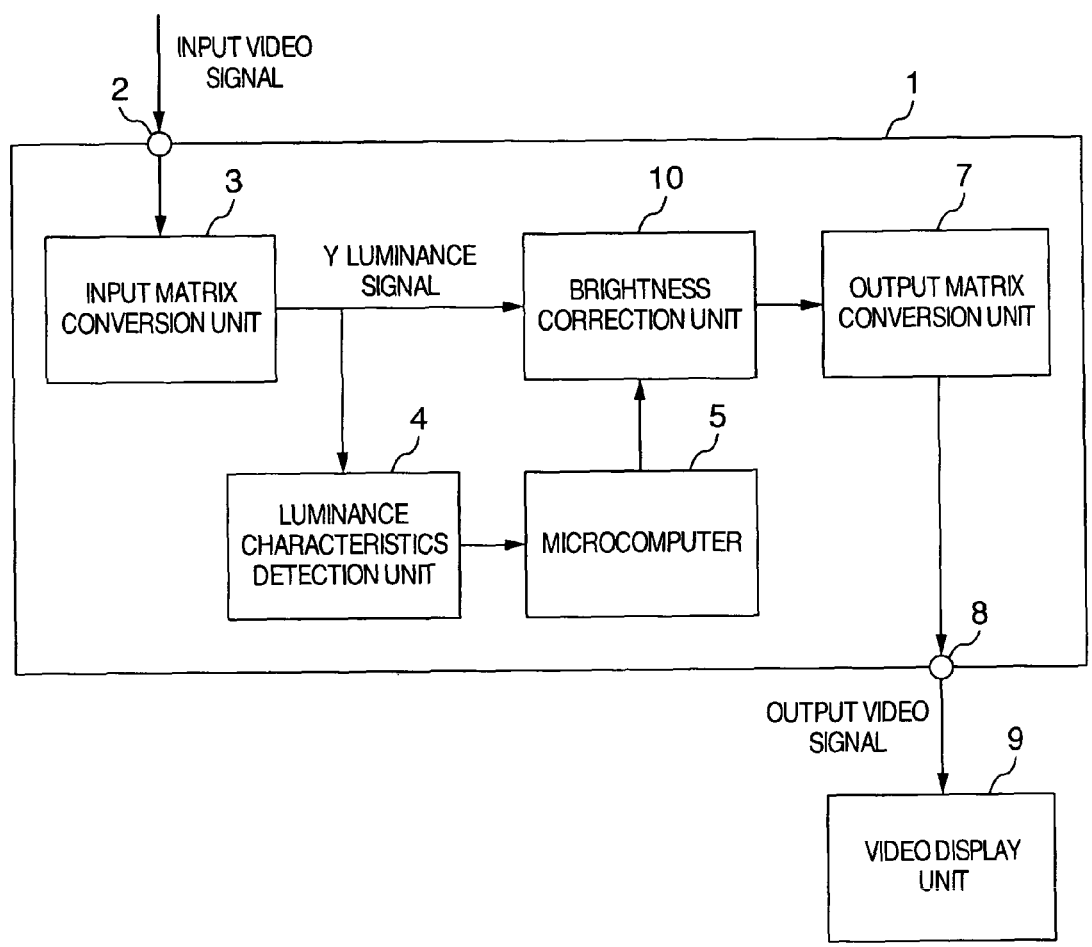
FIG. 8 is a diagram showing the general configuration of a video display device in a second embodiment of the present invention.

FIG. 8 is a block diagram showing a second embodiment of an image processing apparatus of the present invention. Instead of the black stretch unit 6 in FIG. 1, this embodiment comprises a brightness correction unit 10 for shifting the direct-current level (DC level) of an input video signal. The same reference numeral is used to denote the same element in FIG. 1 and further description of that element will be omitted.

Referring to FIG. 8, the brightness correction unit 10 has its DC level shift amount controlled by the luminance control signal formed by a microcomputer 5 and shifts the DC level of the luminance signal Y according to this shift amount. The brightness correction unit 10 performs the contrast enhancement processing to use the margin of the dynamic range, generated by the shift, to its limit and outputs the result to an output matrix conversion unit 7. After that, the same control is performed as in the first embodiment.

The following describes this embodiment with reference to FIG. 8 as well as to FIG. 9 and FIG. 10. In this embodiment, the luminance characteristics detection unit 4, the microcomputer 5, and the brightness correction unit 10 work together to perform the contrast enhancement processing. The brightness correction unit 10 performs the brightness correction control based on the frequency distribution of the luminance histogram detected by the luminance characteristics detection unit 4.

FIG. 9 is a diagram showing a method for calculating a DC level shift amount setting value. In this embodiment, the microcomputer 5 uses the shift amount, set up for each area of the luminance histogram, to calculate the DC level shift amount setting value based on the frequency distribution of the luminance histogram detected by the luminance characteristics detection unit 4.

Figure 9A:
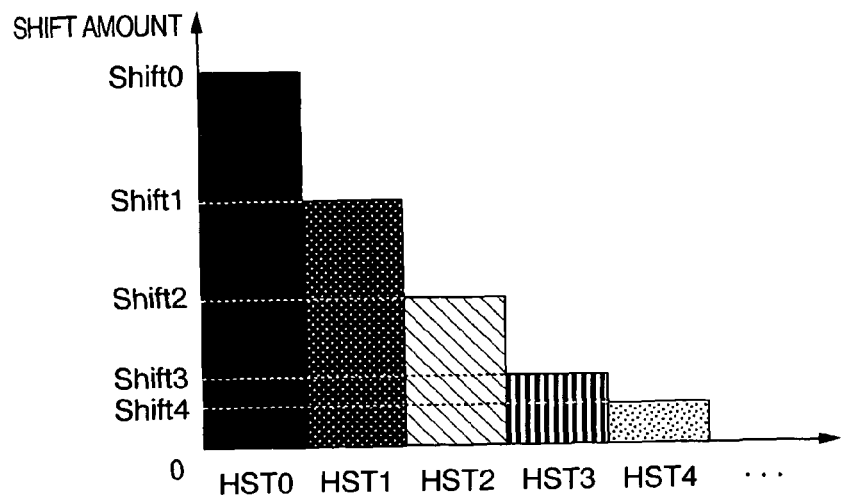
FIGS. 9A-9B are diagrams showing an example of a shift amount calculation method used for a brightness correction control in the second embodiment.

FIG. 9A is a diagram showing the brightness correction shift amount in the luminance areas of the histogram. The brightness correction shift amount refers to the shift amount for lowering the DC level of the luminance signal Y. A large shift amount means a large amount of reduction in the DC level, while a small shift amount means a small amount of reduction in the DC level. In this embodiment, the shift amount is set for each luminance area, and the shift amount actually applied is calculated according to the frequency of each luminance area. The brightness correction shift amounts are set for the areas in advance as follows: Shift0 for the area HST0, Shift1 for the area HST1, Shift2 for the area HST2, Shift3 for the area HST3, and Shift4 for the area HST4. Although not shown in FIG. 9A, Shift5 to Shift15 can also be set for HST5 to HST15, respectively. The example shown in FIG. 9A is exemplary only and any value can be set for the shift amount.

Figure 9B:
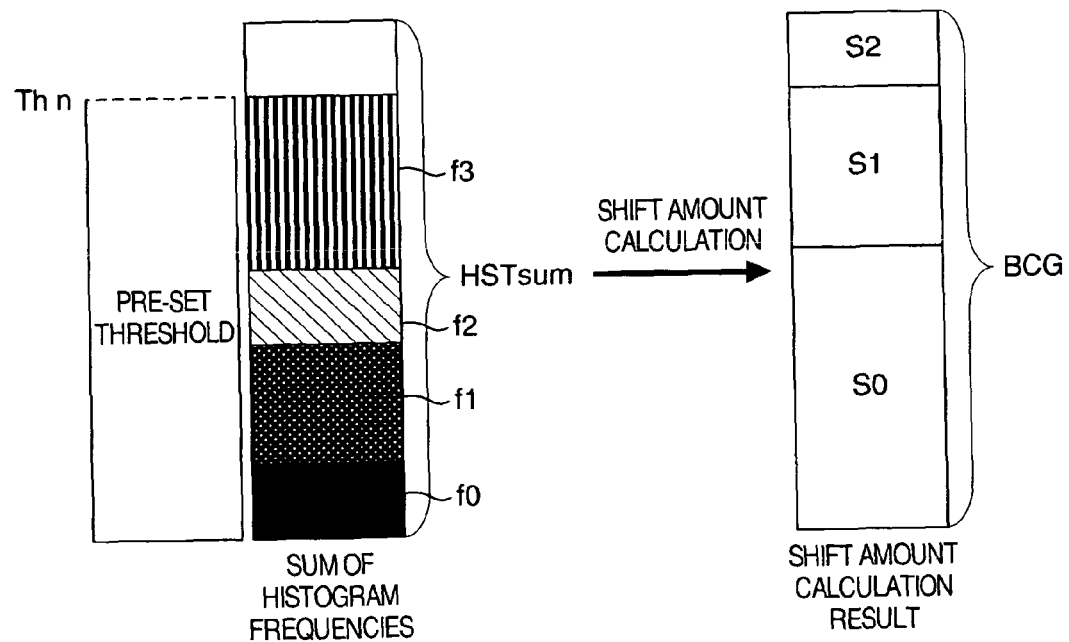

FIG. 9B is a diagram showing the method for calculating a DC level shift amount setting value in this embodiment. The method for calculating the shift amount setting value for brightness correction in this embodiment differs from the method for calculating the black stretch gain amount shown in FIG. 3 in the first embodiment in the following points. That is, the method in this embodiment differs from the method in the first embodiment in that the gain amount Gain is changed to the shift amount Shift, that the gain setting value G calculated for each luminance area is changed to the shift amount setting value S, and that the gain amount BSG actually applied to the black stretch unit 6 is changed to the shift amount BCG applied to the brightness correction unit 10. Except those differences, the calculation method is similar to that in the first embodiment, and the same method is used for referencing the frequencies in the luminance histogram and for calculating the setting value. Therefore, the description of the calculation method is omitted here.

Figure 10A:
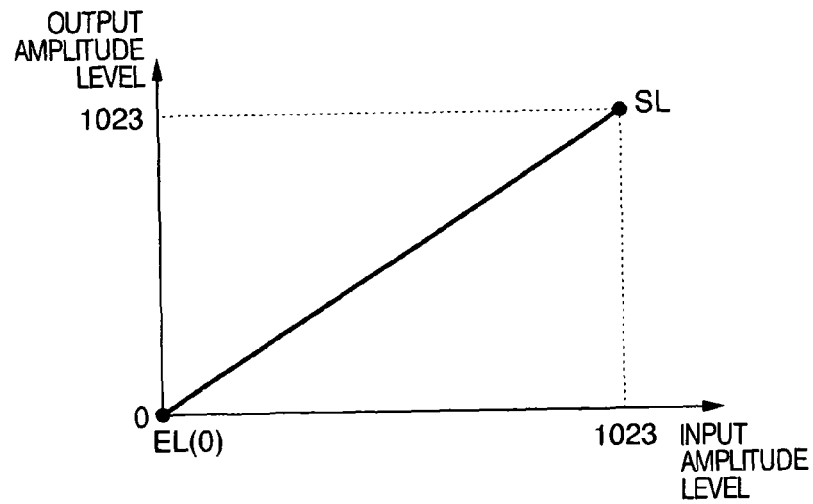
FIGS. 10A-10C are diagrams showing the operation of the brightness correction control in the second embodiment.

FIG. 10 is a diagram showing the input/output characteristics of the brightness correction unit 10 to which the brightness correction shift amount BCG is applied. FIG. 10A is an input/output characteristics diagram showing the linear characteristics, where the input amplitude level is linear to the output amplitude level, before the shift amount BCG is applied to the brightness correction unit 10. For the 10-bit processing, the input amplitude level and the output amplitude level are represented in 1024 gray scales, as shown in FIG. 10A. When the brightness correction control in this embodiment is performed, the line joining the start point SL and the end point EL is shifted downward according to the calculated shift amount BCG. That is, the point SL representing the highest output amplitude level is shifted downward from 1023 and, accordingly, the input amplitude level of the point EL representing the lowest output amplitude level is shifted upward (that is, to the right) from 0.

Figure 10B:
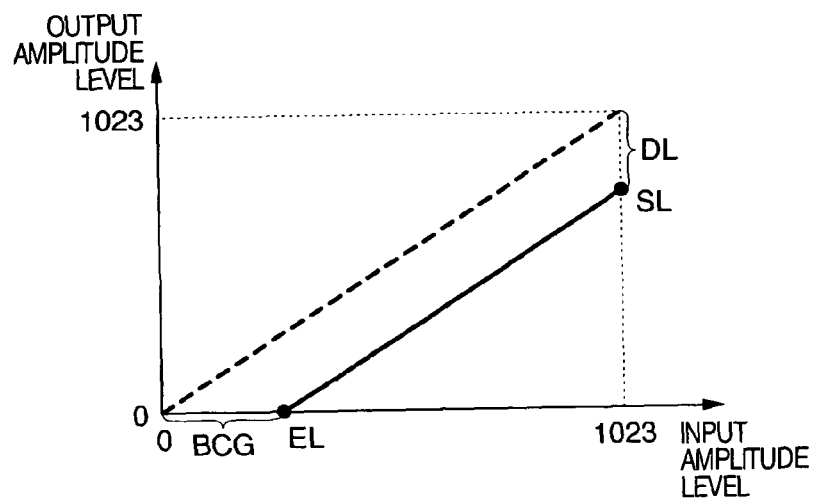

FIG. 10B is a diagram showing an example of the input/output characteristics of the brightness correction unit 10 to which the brightness correction shift amount BCG is applied. As shown in FIG. 10B, the point EL is shifted to the right by the applied BCG level. This shift also causes the point SL to be shifted downward as compared with that shown in FIG. 10A. This control lowers the output amplitude level corresponding to the input amplitude level, darkens the brightness of the whole video, and generates DL that is the margin of the dynamic range. To prevent this condition, this embodiment uses the control to increase the brightness of the whole video and to fully utilize the dynamic range.

Figure 10C:
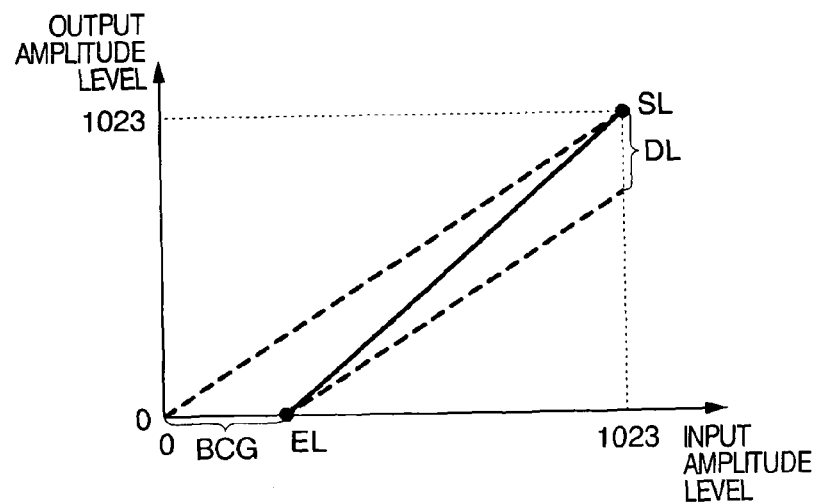

FIG. 10C is a diagram showing the control for utilizing the margin DL of the dynamic range generated as shown in FIG. 10B. As shown in FIG. 10C, the control is performed to shift the point SL to 1023, the maximum value of the output amplitude level, to utilize the DL. This makes the slope of the line joining the point SL and the point EL in FIG. 10C steeper than the slope of the line joining the point SL and the point EL in FIG. 10B. Thus, this control increases the number of gray scales of the output amplitude level to be allocated to the input amplitude level for better gray-scale images, increases the brightness of the video, and improves the visual contrast effect. This control ensures the input/output amplitude level characteristics that do not waste, but fully utilize, the dynamic range.

As described above, the black stretch control in this embodiment is performed as follows. The microcomputer 5 references the frequencies of the luminance areas in a luminance histogram, detected by the luminance characteristics detection unit 4, sequentially beginning with the lowest luminance side, and calculates the brightness correction shift amount for each luminance area. The microcomputer 5 calculates the sum of the shift amounts of the luminance areas and applies the resulting sum to the brightness correction unit 10. This enhances the gray scale of the black on the low luminance side of the video displayed on the video display unit 9 and displays an output video with a better visual contrast effect on the whole video.

Although an image processing apparatus such as a television receiver is used as an example of the image processing apparatus in the above description, the present invention is applied also to a DVD player, a set top box with a digital tuner, or a hard disk recorder. It is apparent that the video display unit is not limited to a liquid crystal panel and a PDP but that the present invention is applicable also to an FED or a rear projection television set.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus comprising:
a detection unit that analyzes a received video signal to detect a frequency of each of a plurality of luminance areas with a luminance at least equal to or lower than a predetermined luminance; and
a black stretch processing unit that performs black stretch processing using the frequency of each of said plurality of luminance areas detected by said detection unit, wherein:
said black stretch processing unit controls a level of a luminance signal in a black stretch range that varies according to the frequency of each of said plurality of detected luminance areas; and
the black stretch range, calculated when a first luminance area with a luminance equal to or lower than the predetermined luminance has a first frequency and a second luminance area with a luminance higher than that of the first luminance area has a second frequency, is larger than the black stretch range calculated when the first luminance area has the first frequency and the second luminance area has a third frequency higher than the second frequency.

2. The image processing apparatus according to claim 1, wherein said detection unit detects the frequency in one frame or one field of the video signal.

3. The image processing apparatus according to claim 1, wherein said image processing apparatus is a video display device having a display unit that displays a video using a signal from said black stretch processing unit.

4. An image processing apparatus comprising:
a detection unit that analyzes a received video signal to detect a frequency of each of a plurality of luminance areas with a luminance at least equal to or lower than a predetermined luminance; and a black stretch processing unit that performs black stretch processing using the frequency of each of said plurality of luminance areas detected by said detection unit, wherein:

said black stretch processing unit lowers a level of a luminance signal in a black stretch range that varies according to the frequency of each of said plurality of detected luminance areas; and the black stretch range, calculated when a first luminance area with a luminance equal to or lower than a predetermined luminance has a first frequency lower than a first threshold and a second luminance area with a luminance higher than that of the first luminance area has a second frequency lower than a second threshold, is larger than the black stretch range at the luminance level calculated when the first luminance area has the first frequency and the second luminance area has a third frequency lower than the second threshold and higher than the second frequency.

5. An image processing apparatus comprising:

a detection unit that analyzes a received video signal to detect a luminance distribution of the video signal; and a black stretch processing unit that, based on a black stretch range varying according to the luminance distribution detected by said detection unit, performs black stretch processing for lowering a luminance level of a video signal in the black stretch range, wherein said black stretch processing unit performs control so that the black stretch range, calculated when said detection unit detects a first luminance distribution, is larger than the black stretch range at the luminance level calculated when said detection unit detects a second luminance distribution, the first luminance distribution is such that a first luminance area with a luminance equal to or lower than a predetermined luminance has a first frequency and a second luminance area with a luminance higher than that of the first luminance area has a second frequency, and the second luminance distribution is such that the first luminance area has the first frequency and the second luminance area has a third frequency higher than the second frequency.

6. The image processing apparatus according to claim 5, wherein said black stretch processing unit sets the luminance level of the video signal in the black stretch range to 0.

7. An image processing apparatus comprising:

a detection unit that analyzes a received video signal to detect a luminance histogram representing a luminance distribution of the video signal;

a black stretch processing unit that performs black stretch processing for the video signal; and a control unit that controls a black stretch amount for use by said black stretch processing unit based on the luminance histogram detected by said detection unit, wherein said control unit performs control so that the black stretch amount, calculated when said detection unit detects a first luminance histogram, is larger than the black stretch amount calculated when said detection unit detects a second luminance histogram, the first luminance histogram is such that a first luminance area with a luminance equal to or lower than a predetermined luminance has a first frequency and a second luminance area with a luminance higher than that of the first luminance area has a second frequency, and the second luminance histogram is such that the first luminance area has the first frequency and the second luminance area has a third frequency higher than the second frequency.

8. The image processing apparatus according to claim 7, wherein the first frequency is smaller than a predetermined first threshold and the second frequency and the third frequency are smaller than the predetermined first threshold.

9. An image processing apparatus comprising:

a detection unit that analyzes a received video signal to detect a frequency of each of a plurality of luminance areas;

a black stretch processing unit that performs black stretch processing for the video signal; and a control unit that controls said black stretch processing unit based on the frequency detected by said detection unit, wherein said control unit calculates a black stretch amount for each of the luminance areas using the frequency detected for each of said plurality of luminance areas in a low-luminance side with a luminance at least equal to or lower than a predetermined luminance and controls said black stretch processing unit using a sum of the black stretch amounts obtained by summing up the calculated black stretch amounts.

10. The image processing apparatus according to claim 9, wherein said control unit compares a first frequency detected in a first luminance area having a luminance equal to or lower than a predetermined luminance with a pre-set first threshold to calculate a first black stretch amount, compares a sum of a second frequency, detected in a second luminance area having a luminance higher than that of the first luminance area, and the first frequency with a pre-set second threshold to calculate a second black stretch amount, and sums up the first black stretch amount and the second black stretch amount to calculate the sum of the black stretch amounts.

11. The image processing apparatus according to claim 9, wherein the first black stretch amount is 0 if the first frequency exceeds the first threshold, and the second black stretch amount is 0 if the sum of the first frequency and the second frequency exceeds the second threshold.

12. The image processing apparatus according to claim 9, wherein said control unit compares a first frequency, detected in a first luminance area having a luminance equal to or lower than a predetermined luminance, with a pre-set first threshold to calculate a first black stretch amount, compares a second frequency, detected in a second luminance area having a luminance higher than that of the first luminance area, with a pre-set second threshold to calculate a second black stretch amount, and sums up the first black stretch amount and the second black stretch amount to calculate the sum of the black stretch amounts.

13. The image processing apparatus according to claim 12, wherein the first black stretch amount is 0 if the first frequency exceeds the first threshold, and the second black stretch amount is 0 if the second frequency exceeds the second threshold.

14. The image processing apparatus according to claim 9, further comprising:

a brightness correction unit that uses the frequency of each of said plurality of luminance areas detected by said detection unit to shift a direct current level of a luminance signal.

15. An image processing apparatus comprising:

a detection unit that analyzes a received video signal to detect a frequency of each of a plurality of luminance areas;

a brightness correction unit that shifts a direct current level of the video signal; and a control unit that controls said brightness correction unit based on the frequency detected by said detection unit, wherein said control unit calculates a shift amount for each of said plurality of luminance areas using the frequency detected for each of said plurality of luminance areas in a low-luminance side with a luminance at least equal to or lower than a predetermined luminance and controls said brightness correction unit using a sum of the shift amounts obtained by summing up the calculated shift amounts.

16. The image processing apparatus according to claim 15, wherein an amplitude level of the video signal is controlled based on a dynamic range margin generated by the direct-current level shift control by said brightness correction unit.

* * * * *